United States Patent
Roy et al.

(10) Patent No.: US 10,047,960 B2
(45) Date of Patent: Aug. 14, 2018

(54) HEATING DEVICE

(71) Applicant: STUMP CHUNKS LLC, Hooksett, NH (US)

(72) Inventors: Daniel Roy, Derry, NH (US); David Roy, Derry, NH (US); Norm Roy, Derry, NH (US)

(73) Assignee: STUMP CHUNKS LLC, Hooksett, NH (US)

( * ) Notice: Subject to any disclaimer, the term of this patent is extended or adjusted under 35 U.S.C. 154(b) by 319 days.

(21) Appl. No.: 14/678,047

(22) Filed: Apr. 3, 2015

(65) Prior Publication Data

US 2016/0290653 A1    Oct. 6, 2016

(51) Int. Cl.
*A47J 37/07* (2006.01)
*F24B 1/182* (2006.01)

(52) U.S. Cl.
CPC ............. *F24B 1/182* (2013.01); *A47J 37/07* (2013.01); *A47J 37/0704* (2013.01)

(58) Field of Classification Search
None
See application file for complete search history.

(56) References Cited

U.S. PATENT DOCUMENTS

| | | | | |
|---|---|---|---|---|
| 2,201,756 A * | 5/1940 | Avetta | ................. | A47J 37/0718 123/41.27 |
| 2,619,951 A * | 12/1952 | Kahn | ................. | A47J 37/0731 126/25 A |
| 2,774,345 A * | 12/1956 | Peplin | ................. | A47J 37/0718 126/25 R |
| 2,855,918 A * | 10/1958 | Tescula | ............... | A47J 37/0718 126/25 R |
| 2,909,170 A * | 10/1959 | Hathorn, Jr. | ........ | A47J 37/0704 126/163 A |
| 2,962,019 A * | 11/1960 | Lundgren | ........... | A47J 37/0731 126/25 R |
| 3,131,686 A * | 5/1964 | Budd | ................. | A47J 37/0718 126/14 |
| 3,258,001 A * | 6/1966 | Virgil | ................. | A47J 37/0704 126/25 AA |
| 3,421,433 A * | 1/1969 | Carmen | ............... | A47J 37/0731 126/21 A |
| 3,512,515 A * | 5/1970 | McGee | ............... | A47J 37/0704 126/25 A |
| 3,572,313 A * | 3/1971 | Ciancaglini | ......... | A47J 37/0718 126/25 R |
| 3,851,639 A * | 12/1974 | Beddoe | ............... | A47J 37/0763 126/25 R |
| 3,975,999 A | 8/1976 | Carroll | | |
| 4,200,085 A * | 4/1980 | Buehl | ....................... | F24C 1/16 126/349 |
| 4,207,862 A | 6/1980 | Meyer | | |
| D255,863 S | 7/1980 | Futch | | |
| 4,263,889 A | 4/1981 | Martenson | | |

(Continued)

FOREIGN PATENT DOCUMENTS

EP    0507199    10/1992
WO    1997019297    5/1997

*Primary Examiner* — Gregory Huson
*Assistant Examiner* — Martha Becton
(74) *Attorney, Agent, or Firm* — Day Pitney LLP (57) ABSTRACT

A combination grill and fire pit heating device. The combination heating device having a grilling mode that is easily converted into a fire pit mode by adjustment of an orientation of the device.

16 Claims, 4 Drawing Sheets

(56) References Cited

U.S. PATENT DOCUMENTS

| | | | |
|---|---|---|---|
| 4,572,062 A | | 2/1986 | Widdowson |
| 4,757,756 A | | 7/1988 | Van Marr |
| 4,766,879 A | | 8/1988 | Freese |
| 4,884,499 A | * | 12/1989 | Rensch ............... A47J 37/0688 126/9 R |
| 5,499,574 A | * | 3/1996 | Esposito ............. A47J 37/0688 126/25 R |
| 5,598,834 A | | 4/1997 | Grady |
| 6,125,835 A | * | 10/2000 | Montano ................. F24B 1/205 126/19 M |
| 6,748,939 B1 | | 6/2004 | Gober |
| 6,913,011 B1 | * | 7/2005 | Snider ................. A47J 37/0704 126/25 R |
| 6,929,001 B2 | | 8/2005 | Yoon |
| 8,726,896 B2 | * | 5/2014 | Guillory ............. A47J 37/0704 126/25 R |
| 8,919,334 B2 | * | 12/2014 | Glanville ............ A47J 37/0704 126/1 R |
| 2007/0240698 A1 | * | 10/2007 | Holbrook ............ A47J 37/0786 126/25 R |
| 2011/0011387 A1 | * | 1/2011 | Sawaya ............... A47J 37/0731 126/25 AA |

\* cited by examiner

HEATING DEVICE

FIELD OF THE INVENTION

The present disclosure relates generally to heating devices. More particularly, the present disclosure relates to a device that can be used as a grill when oriented in a horizontal position, and can be used as a fire-pit when rotated to a vertical position.

DESCRIPTION OF RELATED ART

Grills and mobile fire pits are devices employed recreationally by many. Generally, the grill and fire pit are separate devices and located in different positions in a person's yard or outdoor space.

Grills provide an enjoyable and convenient way to cook food over direct heat such as an open flame or heated coals. Mobile fire pits are used to contain a fire without requiring a permanent fire pit dug into the ground. They also allow an outdoor fire such as a "bonfire" to be created easily, and in any location. Fire pits are particularly desirable as a place to gather socially.

Grills serve a similar function as a place to gather for social events. However, these devices serve a singular purpose, namely cooking. For example, once cooking is completed, hot charcoal is left to burn out. Similarly, a gas-based flame source from a gas grill is frequently limited to a cooking purpose by the structure of grills.

Therefore, what is needed is a heating device that combines a grill and a fire pit into a unitary device.

SUMMARY OF THE INVENTION

The subject matter of this application may involve, in some cases, interrelated products, alternative solutions to a particular problem, and/or a plurality of different uses of a single system or article.

In one aspect, a heating device is provided that is capable of both a grilling mode in a horizontal orientation, and a fire pit mode in a vertical orientation. The heating device is formed of a barrel having a bottom and a sidewall. The barrel defines an open top and open rear, with a barrel cavity defined by the bottom and sidewall and accessible by the open top and open rear. A kettle formed by a kettle bottom and kettle sidewall which define a kettle cavity accessible through an open kettle top is attached perpendicularly to the barrel at the open rear of the barrel. As such, the kettle cavity is in communication with the barrel cavity through the kettle open top and barrel open rear. The kettle is attached, or integrally formed, such that one edge of the kettle aligns with the bottom of the barrel and is shaped so that it can flushly attach or form with the barrel sidewall. Further, a second opposite edge of the kettle extends beyond a top of the barrel sidewall. As such, the heating device, as constructed with the barrel and kettle is capable of a grilling mode and fire pit mode. The grilling mode is available when the device is in a first position having the barrel bottom being oriented substantially horizontally (referred to as the heating device being oriented horizontally). The fire pit mode is available when the device is in a second position having the barrel bottom oriented substantially vertically, resulting in the kettle being oriented upwardly (referred to as the heating device being oriented vertically).

In another aspect, a heating device is provided being capable of both a grilling mode in a horizontal orientation, and a fire pit mode in a vertical orientation. The heating device is formed by a barrel which forms an open region defined by a bottom and two sidewalls, and also forms a kettle which is formed by an extension of the two sidewalls upwardly and an eventual joining of the sidewalls. A back sheet forms a bottom of the kettle and defines a cavity bounded by the back sheet and the sidewall portions that extend and join together. A grill grate is removably mounted within the barrel cavity. As such, the heating device, as constructed with the barrel and kettle is capable of a grilling mode and fire pit mode. The grilling mode is available when the device is in a first position having the barrel bottom being oriented substantially horizontally (referred to as the heating device being oriented horizontally). The fire pit mode is available when the device is in a second position having the barrel bottom oriented substantially vertically, resulting in the kettle being oriented upwardly (referred to as the heating device being oriented vertically).

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention provides a heating device configured as a combined grill and fire pit device configured such that when the device is in a horizontal position it may be used as a grill, and when in a vertical position, it may be used as a mobile fire pit.

The present invention is configured generally as an elongate vessel that defines a barrel portion (also referred to generally herein as a barrel) that defines a cavity which forms a structure for the grill, and a kettle portion (also referred to generally herein as a kettle). The kettle portion and barrel portion are oriented substantially perpendicularly to each other and together make up the vessel. The barrel portion defines the part of the heating device used as the grill, while the kettle portion defines the part of the heating device used as a fire pit. As such, a cavity formed by the barrel portion and a cavity formed by the kettle portion are in communication with one another and together form a cavity generally defined by the elongate vessel.

The barrel may be any shape and configuration that is capable of forming a barrel cavity that may allow for grilling. In one embodiment, the barrel may be formed as an elongate cylinder, prism, or similar three dimensional shape having a cutaway opening along at least part of its length. For example, instead of a circular cross section, the barrel may have a hexagonal or octagonal cross section. Further, the barrel may be made of any substantially fire resistant material. For example, the barrel may be made of metals, certain plastics, ceramics, composite materials, concrete, stone, or the like.

The kettle may be any shape and configuration that is capable of forming a kettle cavity that may contain a burning fuel to be used as a fire pit. In one embodiment, the kettle may be formed as an elongate cylinder, prism, or similar three dimensional shape having a cutaway opening across its width. Further, the kettle may be made of any substantially fire resistant material. For example, the barrel may be made of metals, certain plastics, ceramics, composite materials, concrete, stone, or the like.

In one embodiment, the kettle is attached perpendicularly to the barrel at an end of the barrel such that one edge of the kettle is aligned with a bottom surface of the barrel, with the opposite edge of the kettle extended beyond a top of the barrel.

The heating device may comprise a support structure that supports the device off the ground and that also may facilitate its movement between the horizontal grilling mode and vertical fire pit mode.

In one embodiment, the support structure may comprise at least three legs. In a further embodiment, one of these three legs may have a wheel. In another embodiment, a bottom of the kettle may have a leg such that it may be supported off the ground when the device is oriented vertically. However, it should be understood that any support structure capable of supporting the device off the ground may be used.

In one embodiment, a handle or handles may extend from the barrel on a side opposite to the kettle. In this embodiment, the handle may facilitate movement of the device, as well as facilitate movement between the horizontal position and the vertical position, among other functions. The handle may be of any configuration allowing a user to grasp and manipulate the device.

A grill grate may be either permanently or removably received by the barrel. This grill grate may be of any configuration capable of supporting items to be grilled over a heat source.

In a particular embodiment, the grill grate may be rotatable within the barrel. In this embodiment, the grate may allow movement of items on top of the grate from directly over a heat source, or away from the heat source-allowing indirect cooking. An embodiment of the rotatable grate may involve a post attached to a bottom of the barrel with a pivotable attachment to the grill grate. Further, a motor or other rotating device may be in communication with the post or grate to automatically rotate the grill grate. The pivotable attachment may be positioned anywhere on the grate, for example, near a center of the grill grate, allowing rotation of the grate. It should further be understood that this rotatable grill grate embodiment may be used not only on the present heating device, but also any other grilling device such as an existing gas or charcoal grill configuration, or any new grilling configuration. Examples of existing gas or charcoal grill configurations include round kettle type charcoal or gas grills, barrel type grills, and the like.

The device may be provided with or without a cover. This cover may be openable or closable, and in some embodiments may be removable entirely from the device.

The grill may be heated by any fuel source including propane, natural gas, wood, charcoal, electricity, and the like. Depending on embodiment, the heat source may be movable between the barrel and kettle cavities, the heat source may extend into both cavities, or the heat source may be limited to within the barrel cavity. In embodiments with movable heat sources such as charcoal or wood, the movable heat source may be easily movable between the cavities by adjusting the device to be either horizontal or vertical, allowing the movable heat source to slide between cavities.

The kettle may be configured with a chimney on its upper surface opposite to a bottom of the barrel. The chimney allows smoke and heated gases to escape from the kettle when the device is oriented horizontally in a grill mode.

In a particular embodiment, a valve such as a gravity controlled valve may operate to close the chimney when operated in the vertical fire pit mode of operation, and open the chimney when operated in the horizontal grill mode of operation.

In some embodiments, a foldable shelf may be attached to an edge of the barrel portion. The shelf may move from an upright position parallel with the ground, to a lowered position hanging downwardly. The shelf may be hingedly or otherwise attached to a side of the barrel portion. Further, the shelf or shelves may be securable in an upright or lowered position so that it does not move undesirably when the device is being moved from the grill mode and fire pit mode.

An end of the barrel portion of the device opposite to the kettle may be openable and closable, or may have a chimney or other similar openable portion. This end of the barrel may provide a route for smoke, heated gas, and the like, to escape from the barrel where it may be otherwise trapped when being used as a fire pit.

In one embodiment of use, the device may initially be used as a charcoal grill. The device may be oriented horizontally, with the charcoal ignited and underneath the grill grate. Once a quantity of food is cooked, it may be removed from the grill grate. For conversion to use as a fire pit, the device may simply be rotated, tipped, or otherwise reoriented into its vertical position with the bottom of the kettle being substantially parallel to the ground. During this orientation, if not previously removed, the loose charcoal may slide or fall into the kettle for use as a fire pit. Additional fuel such as wood, additional charcoal, or the like may be added to create a more robust fire.

In some embodiments, the kettle and barrel may be integrally attached, for example as a single barrel, with a portion cut out forming the kettle and the barrel. In other embodiments, the kettle and barrel may be formed separately and attached after formation. Defined in other words, an embodiment of the present invention may be formed as a cylinder (such as a barrel), cut lengthwise along part of its length, and removed. This will form the barrel portion over the cut cylinder part, as well as the kettle portion over the non-cut cylinder part. In this embodiment, a back wall of the cylinder forms the bottom of the kettle.

Figure 1:
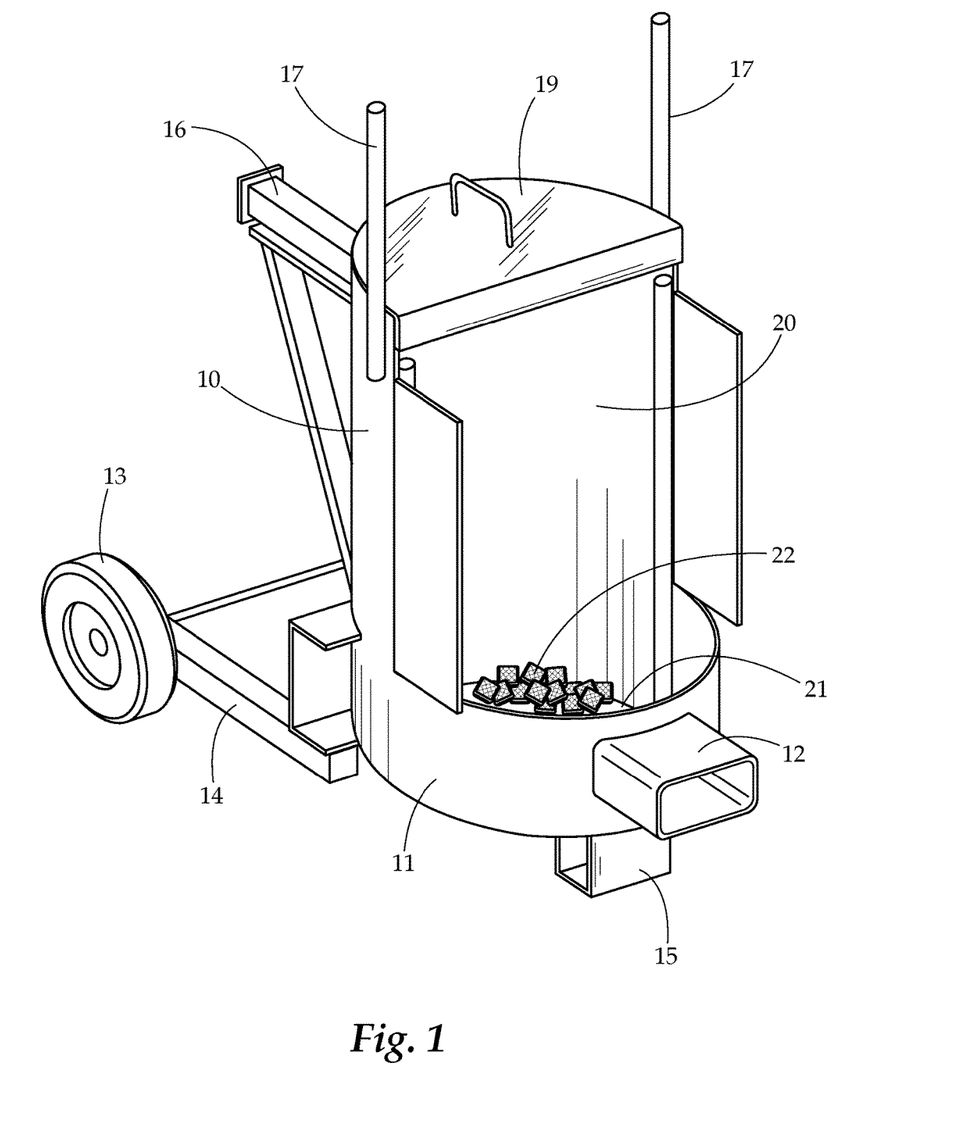
FIG. 1 provides a perspective view of an embodiment of the heating device in a vertical orientation.

FIG. 1 provides a perspective view of an embodiment of the heating device. In this view, the device is in a vertical orientation for use of the fire pit function of the device. The kettle 11 is attached perpendicularly to the barrel 10 such that a lower edge of the kettle 11 is aligned with a bottom of the barrel 10, and in some embodiments may be integral thereto. A top of the kettle 11 extends beyond the top of the barrel 10. The barrel 10 defines a barrel cavity 20 in which a fuel 22 may be used either as a flame source for the fire pit, or as a starter to ignite logs and other fuels for use in the fire pit. A front of the barrel 19 may be either permanently sealed, or at least partially openable, as in the embodiment shown, allowing smoke and heated air to escape when in the fire pit mode.

Kettle 11 defines a kettle cavity 21. The kettle cavity 21 is sized and configured to be used as a fire pit when the device is oriented vertically. A chimney 12 allows the escape of smoke and heated gases when the device is oriented horizontally, and potentially when oriented vertically. In some embodiments, the chimney 12 may be closable and openable. In other embodiments, the chimney 12 may operate as an air inlet when the device is being used as a fire pit and oriented horizontally. A foot 15 is attached to a bottom of the kettle 11. The foot 15 provides a support to hold the kettle 11 off the ground when the device is oriented vertically.

Legs 14, 16 extend from a bottom of the barrel 10. A wheel 13 is attached to leg 14. Further, leg 14 may be used to partially support and stabilize the device when in the vertical position. Handles 17 extend from an edge of the barrel 10 opposite from the kettle 11. These handles are capable of supporting the weight of the device for movement and adjustment.

Figure 2:
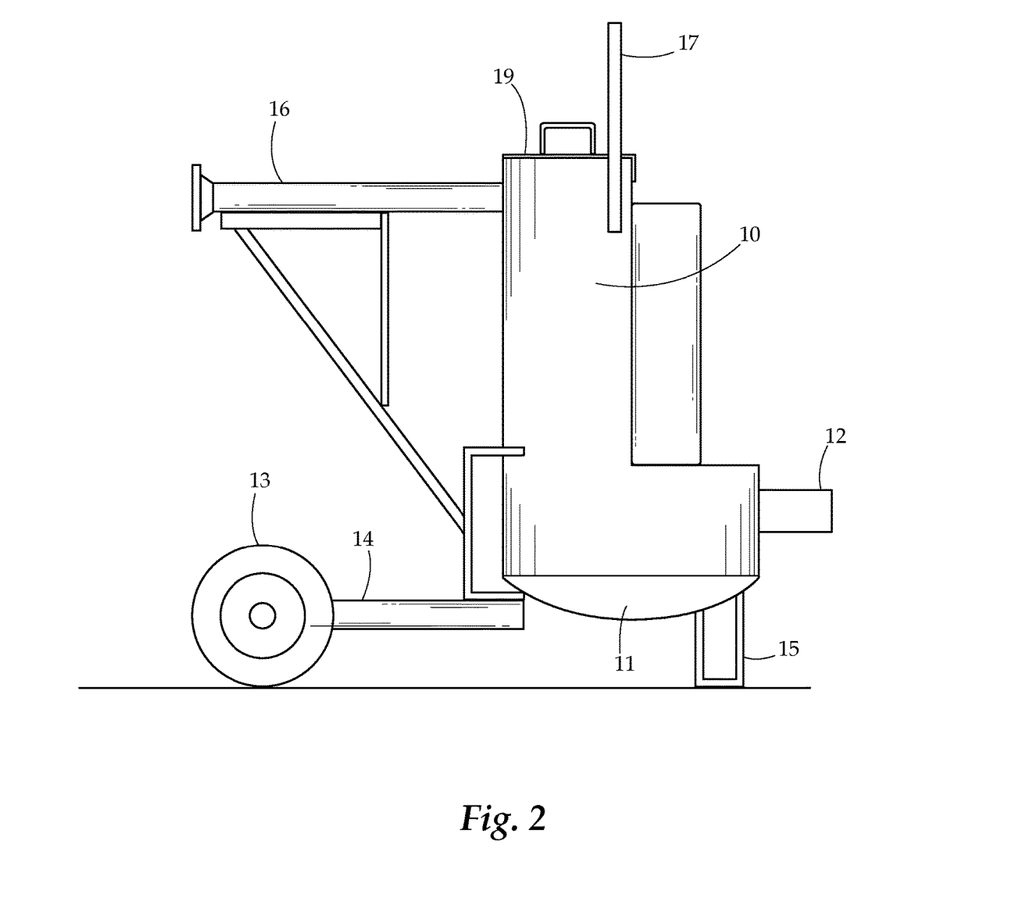
FIG. 2 provides a side view of an embodiment of the present invention in a vertical orientation.

FIG. 2 provides a side view of an embodiment of the heating device. The kettle 11 and barrel 10 can be seen attached to each other, with the kettle 11 top surface extending beyond the edge of the barrel 10. As such, the kettle 11 forms a cavity (not shown) in which fuel such as logs and the like can be placed and burned, forming the base for the fire pit. The barrel 10 is generally not used in fire-pit embodiments except for potentially serving as a rear wall on which to stack fuel, and as a reflector to direct radiant heat energy. Similarly, as will be shown below, the kettle 11 is generally not used in grilling embodiments aside from as a partially covered region for grilling, for holding fuel as a heat source, smoking, and the like. Front cover 19 is formed as a sheet that may be openable, but is shown here in the closed position.

Foot 15 serves to hold and stabilize the device when in the vertical orientation. Leg 14 and wheel 13 similarly act as a support and allow convenient moving of the device and movement of the device from vertical to horizontal arrangement. Handles 17 may facilitate this movement from place to place and between orientations. Chimney 12 may be closable in some embodiments, and may act as an air inlet during the fire pit operation, and an air outlet during grilling operation.

Figure 3:
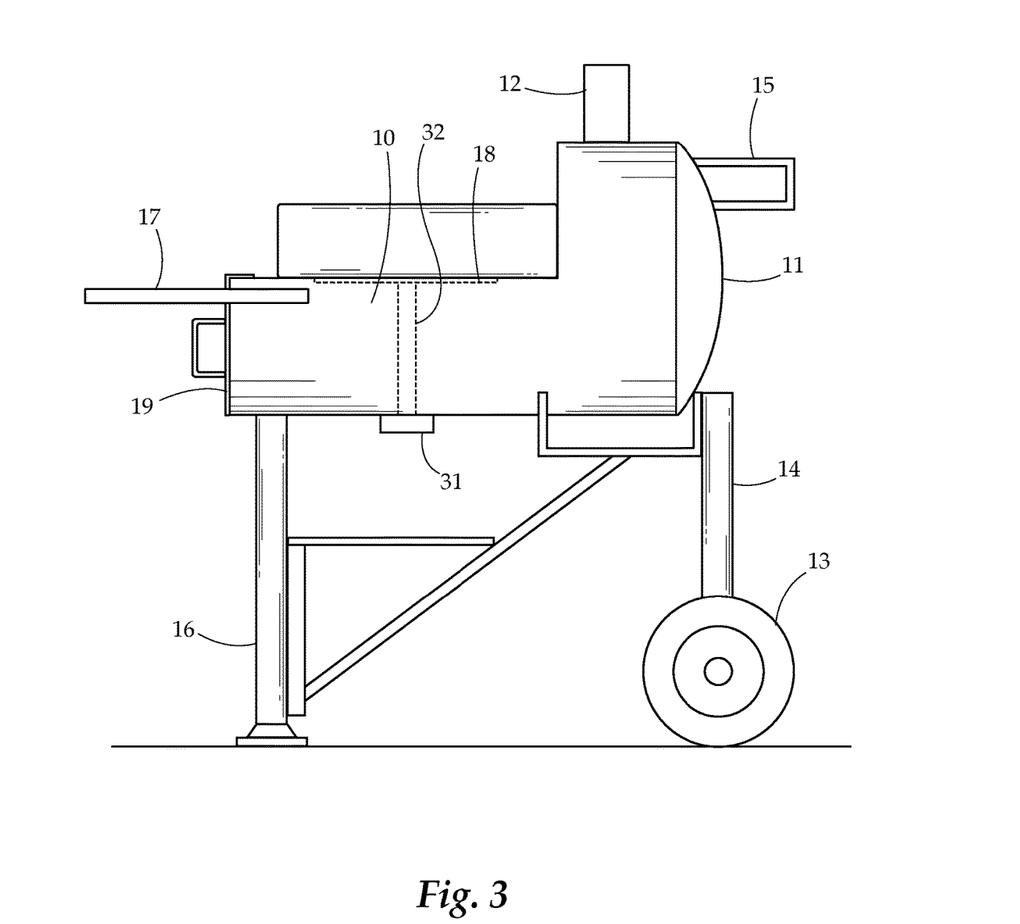
FIG. 3 provides a side view of an embodiment of the present invention in a horizontal orientation.

FIG. 3 provides a side view of the heating device in a horizontal orientation. In this view, the device is in a horizontal orientation for use of the grilling function of the device. The kettle 11 is attached perpendicularly to the barrel 10 such that a lower edge of the kettle 11 is aligned with the bottom of the barrel 10, while a top of the kettle 11 extends beyond the top of the barrel 10. The barrel 10 defines a barrel cavity (not shown) in which a fuel (not shown) may be used to grill food items. A grill grate 18 is positioned within the barrel cavity 20. The grill grate 18 is supported by post 32. In this embodiment, motor 31 is in communication with post 32 and when activated, rotates post 32 and in turn, rotates grill grate 18. In other embodiments, the grill grate 18 may be rotatable in alternative ways such as having a rotatable connection to post 32, or by post being rotatable by a means other than a motor such as a hand crank, wind up, pivotal rotation, or the like.

Kettle 11 defines a kettle cavity (not shown). The kettle cavity is sized and configured to be used as a fire pit when the device is oriented vertically. A chimney 12 allows the escape of smoke and heated gases when the device is oriented horizontally, and potentially when oriented vertically. In some embodiments, the chimney 12 may be closable and openable. In other embodiments, the chimney 12 may operate as an air inlet when the device is being used as a fire pit and oriented vertically. A foot 15 is attached to a bottom of the kettle 11. The foot 15 provides a support to hold the kettle 11 off the ground when the device is oriented vertically.

The heating device of FIG. 3 is supported in its horizontal position by a plurality of legs 14, 16. Wheels 13 are attached to legs 14, allowing it to be easily moved.

Figure 4:
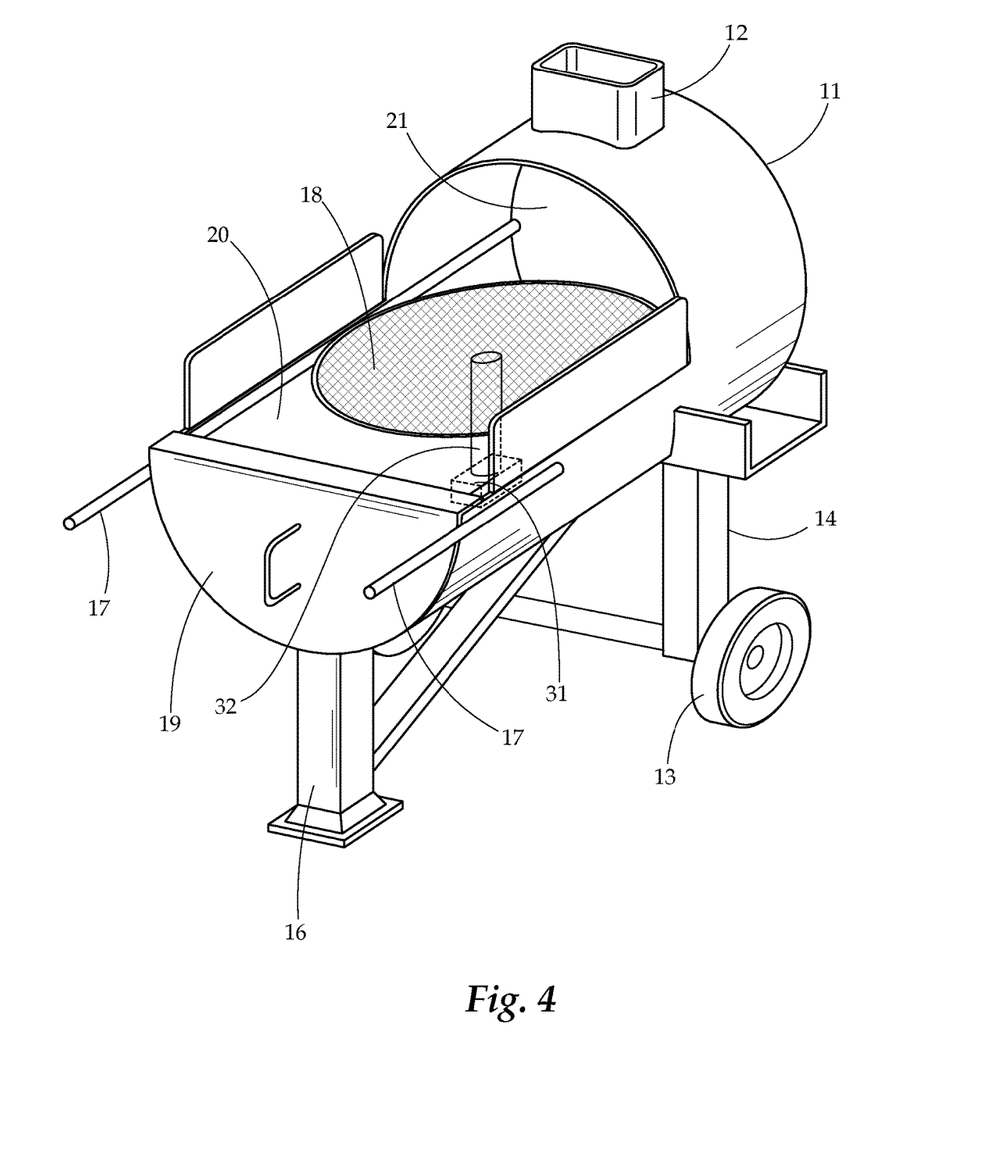
FIG. 4 provides a perspective view of an embodiment of the heating device in a horizontal orientation.

FIG. 4 provides a perspective view of an embodiment of the heating device. In this view, the device is in a horizontal orientation for use of the grilling function of the device. The kettle 11 is attached perpendicularly to the barrel 10 such that a lower edge of the kettle 11 is aligned with a bottom of the barrel 10, while a top of the kettle 11 extends beyond the top of the barrel 10. The barrel 10 defines a barrel cavity 20 in which a fuel (not shown) may be used to grill food items. A grill grate 18 is positioned within the barrel cavity 20 and supported by post 32. A motor 31 (partially shown) is configured to rotate post 32 and in turn rotate grill grate 18.

Kettle 11 defines a kettle cavity 21. The kettle cavity 21 is sized and configured to be used as a fire pit when the device is oriented vertically. A chimney 12 allows the escape of smoke and heated gases when the device is oriented horizontally, and potentially when oriented vertically. In some embodiments, the chimney 12 may be closable and openable. In other embodiments, the chimney 12 may operate as an air inlet when the device is being used as a fire pit and oriented vertically. A foot 15 is attached to a bottom of the kettle 11. The foot 15 provides a support to hold the kettle 11 off the ground when the device is oriented vertically.

It can be seen generally that the kettle bottom is substantially perpendicular to the sides of the kettle portion as well as with the bottom of the barrel. The term substantially perpendicular is used herein to refer not only to literally perpendicular, but also an angle that is between 45 degrees to 135 degrees. As such, any angle within this range between the kettle bottom, and kettle sides or barrel bottom is intended to be substantially perpendicular. The bottom of both kettle and barrel may also be curved, flat, or any other shape, without straying from the scope of the present invention.

Similarly, it can be seen that the kettle sides and barrel bottom are substantially parallel, and generally integrated together. The term substantially parallel is used herein to refer not only to literally parallel, but also an angle that is between +/−45 degrees. As such, any angle within this range between the barrel bottom and kettle sides is intended to be substantially parallel.

The term substantially horizontal is used herein to refer to an orientation of the device. Substantially horizontal refers generally to a horizontal orientation of the device, and a nearly horizontal orientation such that the device is closer to horizontal than vertical (+/−45 degrees). Similarly, the term substantially vertical is used herein to refer to an orientation of the device. Substantially vertical refers generally to a vertical orientation of the device, and a nearly vertical orientation such that the device is closer to horizontal than vertical (+/−45 degrees).

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A heating device comprising:
an elongate vessel having a barrel portion and a kettle portion connected to the barrel portion, the barrel portion forming a first side of the vessel;
wherein the kettle portion comprises an end and a continuous sidewall defining a kettle cavity;
wherein the barrel portion comprises a bottom and sides, the bottom and sides defining a barrel cavity accessible through an open top, the kettle end being substantially perpendicular to the barrel bottom and extending beyond the open top of the barrel portion;
wherein the heating device is capable of rotation between a first, grilling mode when oriented in a first position having the barrel bottom oriented horizontally, and second, non-grilling fire pit mode when oriented in a second position having the barrel bottom oriented substantially vertically, said rotation comprising tilting the heating device approximately 90 degrees to transition from said first position to said second position or vice versa;
wherein the barrel portion comprises a grill grate mounted therein, the grill grate being connected to a motor by means of a shaft and configured to rotate within the barrel portion while the heating device is stationary and independent of the 90 degree transition from said first position to said second position; and
wherein the heating device comprises a fuel source positionable within the barrel cavity when in the grill mode and being movable to the kettle cavity when the heating device is in the non-grilling fire pit mode.

2. The heating device of claim 1 further comprising:
a plurality of legs extending from an exterior of the barrel portion, the plurality of legs supporting the heating device off the ground; and
a foot extending from an exterior of the kettle portion, the foot supporting the heating device off the ground when the heating device is in the non-grilling fire pit mode.

3. The heating device of claim 2 further comprising a wheel on at least one of the plurality of legs extending from the exterior bottom of the barrel.

4. The heating device of claim 1 wherein the kettle portion defines a chimney oriented upwardly when the device is in the grill mode.

5. The heating device of claim 4 wherein the chimney is configured to transition from an open position when the heating device is in the grill mode, to a closed position when the heating device is in the non-grilling fire pit mode.

6. The heating device of claim 1 further comprising a handle extending from the first side of the vessel opposite to the kettle.

7. The heating device of claim 1 wherein an end of the first side of the vessel at the terminal of the barrel portion opposite to the kettle portion is formed of an openable panel capable of movement between a closed position substantially sealing the first side end of the vessel, and an open position allowing the first side end of the vessel to provide access to the barrel cavity.

8. A heating device comprising:
a barrel, the barrel having a bottom and two sidewalls, a portion of the two sidewalls of the barrel forming a kettle, wherein a remainder of the two barrel side walls and bottom not forming the kettle portion define an open top and a barrel cavity; and
a back wall of the barrel forming a bottom of the kettle, wherein the back wall and sidewalls form a kettle cavity in communication with the barrel cavity; and
a grill grate removably mounted within the barrel cavity, the grill grate being connected to a motor by means of a shaft and configured to rotate within the barrel cavity while the heating device is stationary and independent of the 90 degree transition from said first position to said second position; and;
wherein the heating device is capable of rotation between a first, grilling mode when oriented in a first position having the barrel bottom oriented substantially horizontally, and a second, non-grilling fire pit mode when oriented in a second position having the barrel bottom oriented substantially vertically, said rotation comprising tilting the heating device approximately 90 degrees to transition from said first position to said second position or vice versa; and
wherein the heating device comprises a fuel source positionable within the barrel cavity when in the grill mode and being movable to the kettle cavity when the heating device is in the non-grilling fire pit mode.

9. The heating device of claim 8 further comprising:
a plurality of legs extending from an exterior bottom of the barrel, the plurality of legs supporting the heating device off the ground; and
a foot extending from an exterior bottom of the kettle, the kettle foot supporting the heating device off the ground when the heating device is in the non-grilling fire pit mode.

10. The heating device of claim 9 further comprising a wheel on at least one of the plurality of legs extending from the bottom of the barrel.

11. The heating device of claim 8 wherein the kettle defines a chimney oriented upwardly when the device is in the grill mode.

12. The heating device of claim 11 wherein the chimney is configured to transition from an open position when the heating device is in the grill mode, and to a closed position when the heating device is in the non-grilling fire pit mode.

13. The heating device of claim 8 further comprising a handle extending from an end of the barrel on a side opposite to the kettle.

14. The heating device of claim 8 wherein a front end of the barrel opposite to the kettle end of the barrel is formed of an openable panel capable of movement between a closed position substantially sealing the front end of the barrel, and an open position allowing the front end of the barrel to provide access to the barrel cavity.

15. A method of using the device of claim 1 comprising the steps of:
positioning the heating device in the grill mode;
igniting a first fuel positioned within the barrel cavity;
placing a quantity of food on a grill grate, the grill grate positioned within the barrel cavity above the fuel;
removing the quantity of food from the grill grate once cooked;
removing the grill grate from the barrel cavity;
rotating the heating device from the grilling mode to the non-grilling fire pit mode;
adding a second fuel to the kettle cavity; and
igniting the second fuel using the first fuel.

16. The method of claim 15 wherein the step of rotating the heating device form the grill mode to the non-grilling fire pit mode comprises tilting the heating device approximately 90 degrees toward the kettle using a handle; and further comprising the step of:

sliding the first fuel from the barrel cavity to the kettle cavity, the first fuel being a solid fuel slidable along the bottom of the barrel cavity into the kettle cavity.

\* \* \* \* \*